L. SYKES.
CONNECTING ROD AND TOGGLE FOR PNEUMATIC DRILLS, AIR TOOLS, AND THE LIKE.
APPLICATION FILED NOV. 7, 1918.
1,318,704.  Patented Oct. 14, 1919.
3 SHEETS—SHEET 1.
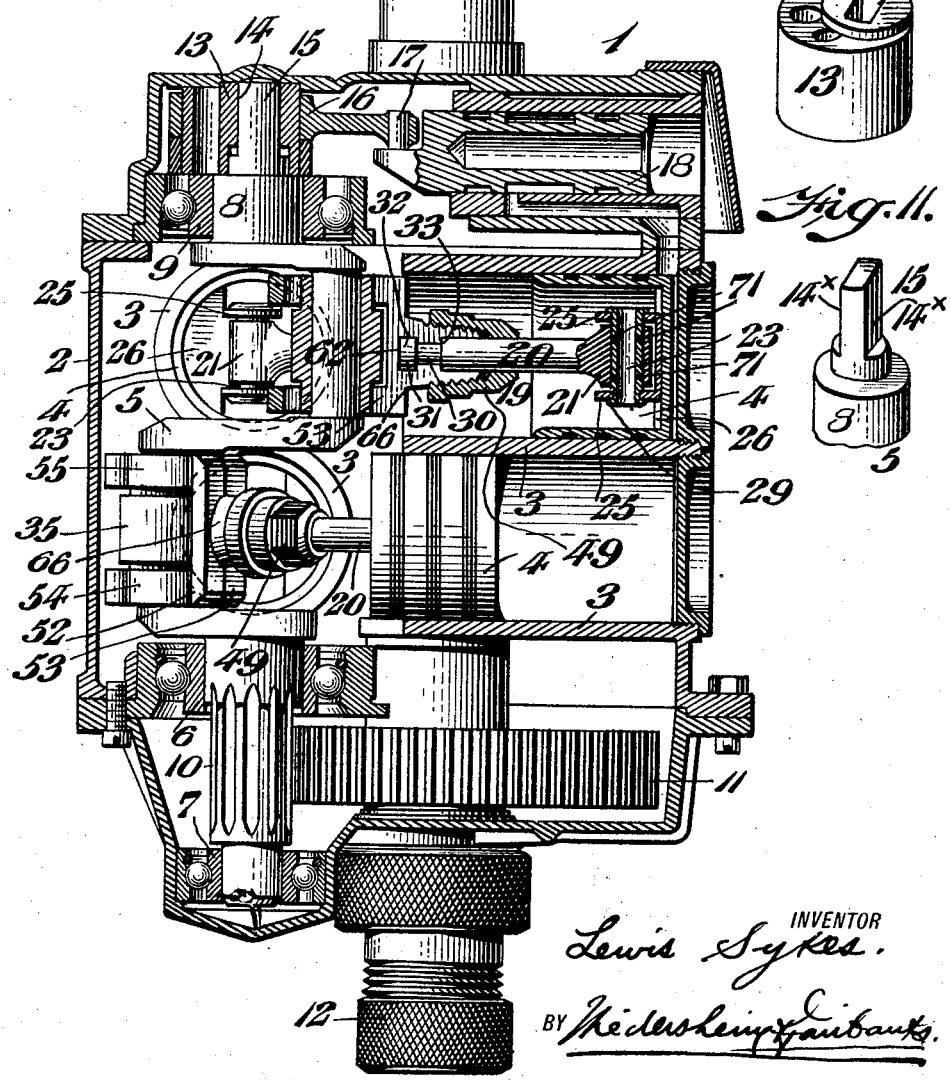
INVENTOR
Lewis Sykes.
BY
ATTORNEYS

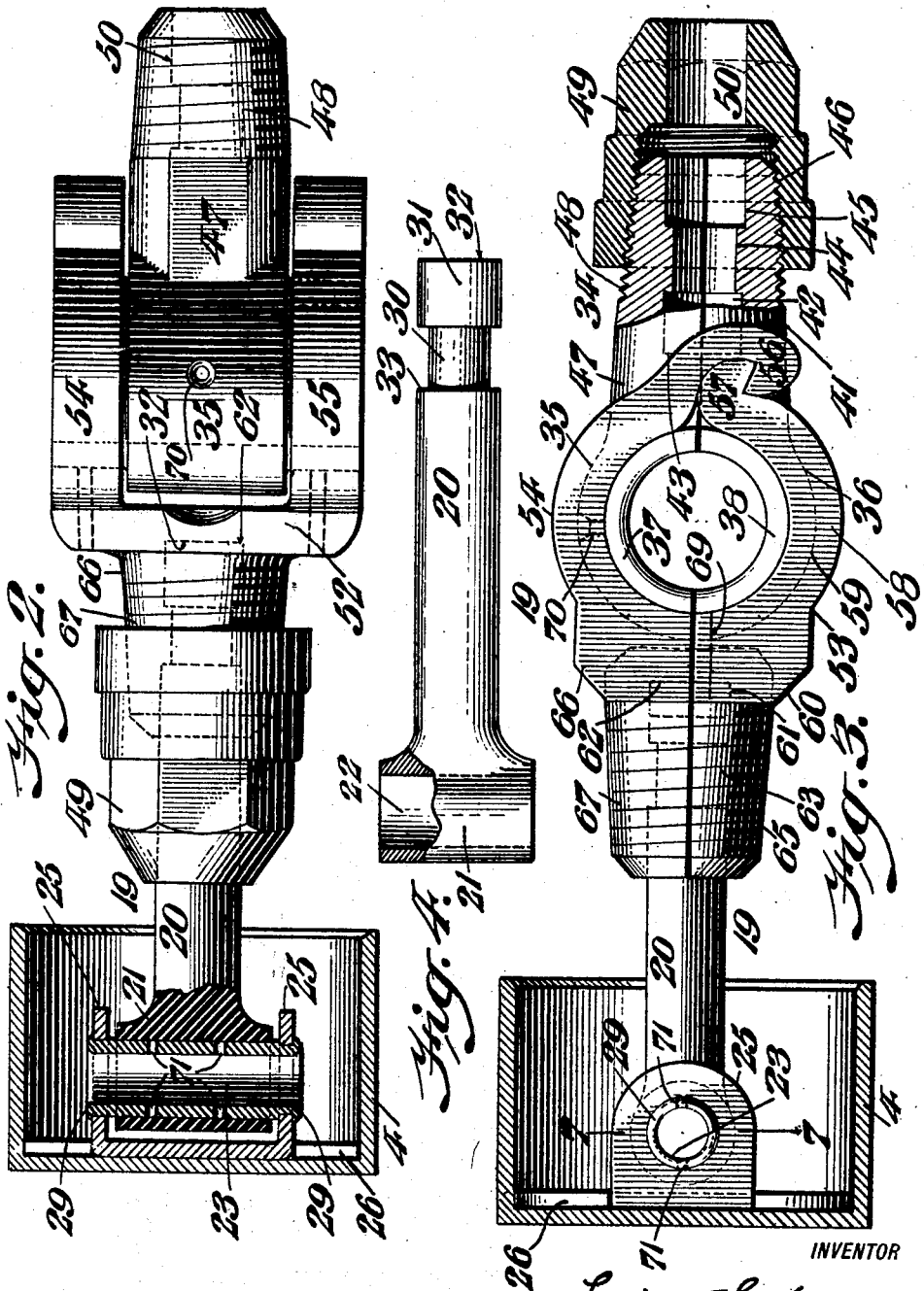

L. SYKES.
CONNECTING ROD AND TOGGLE FOR PNEUMATIC DRILLS, AIR TOOLS, AND THE LIKE.
APPLICATION FILED NOV. 7, 1918.
1,318,704.
Patented Oct. 14, 1919.
3 SHEETS—SHEET 3.
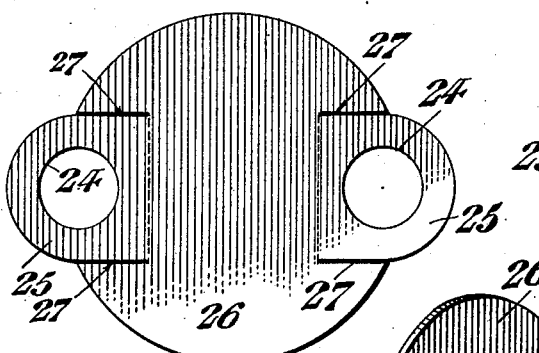
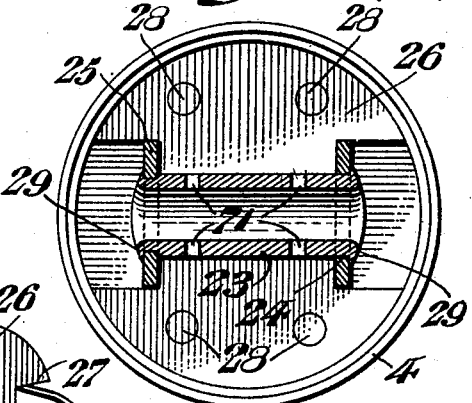
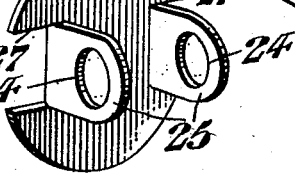
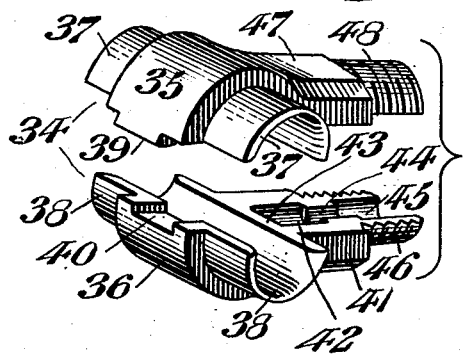
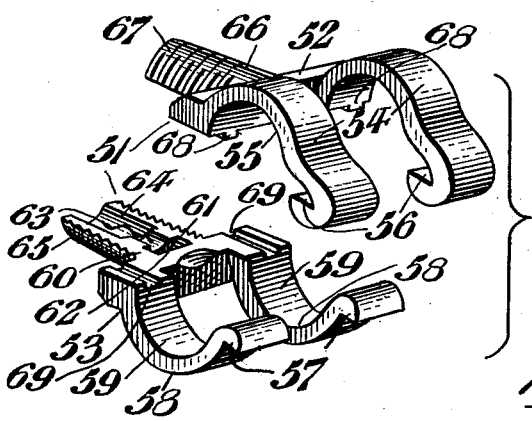

UNITED STATES PATENT OFFICE.

LEWIS SYKES, OF CAMDEN, NEW JERSEY, ASSIGNOR, BY DIRECT AND MESNE ASSIGNMENTS, TO KELLER PNEUMATIC TOOL COMPANY, OF GRAND HAVEN, MICHIGAN, A CORPORATION OF MICHIGAN.

CONNECTING-ROD AND TOGGLE FOR PNEUMATIC DRILLS, AIR-TOOLS, AND THE LIKE.

1,318,704.     Specification of Letters Patent.     Patented Oct. 14, 1919.

Application filed November 7, 1918. Serial No. 261,517.

*To all whom it may concern:*

Be it known that I, LEWIS SYKES, a citizen of the United States, residing in the city and county of Camden, State of New Jersey, have invented a new and useful Connecting-Rod and Toggle for Pneumatic Drills, Air-Tools, and the like, of which the following is a specification.

My invention relates generally to a novel construction of a pneumatic drill, air tool or similar implement, and relates more particularly to a novel construction of a piston rod and means for uniting the ends of the piston rod with the inside and outside toggles which co-act with the crank shaft, the opposite end of the piston rod being connected with the piston in a novel and durable manner.

In the devices of the prior art with which I am very familiar, it has heretofore been the practice to employ a ball and socket connection between the piston and the contiguous end of the piston rod, while the opposite end of the piston rod is secured in position by a hinged toggle, which in practice I have found to be an unsatisfactory construction, since the hinge pins shear and the reduced section of metal surrounding said hinge pins breaks down, so that the entire strain is thrown upon the tapered end of the toggles and the binding nut, which connects the two halves of the toggle. This binding nut has heretofore been made of steel, heat treated to a certain degree with a straight internal thread to engage the male taper thread on the end of the toggle.

I have found that the practice of forcing this soft, straight threaded nut over the tapered end of the toggles, thereby stretching the metal in the nut anywhere from 1/64 to 1/16 of an inch, is objectionable, since by the time this nut is only half way home, the metal in the nut is fatigued beyond repair, and the mechanism referred to will not in practice withstand the continued wrecking force and vibration to which it is subjected for any length of time.

Furthermore, in the structure of the prior art, the threaded split clamping nut, which is intended for a lock and clamp combined, instead of clamping the piston rod, has a tendency to unseat the binding nut, already fatigued, and allows the piston rod to become loose and the intermittent impulses of air against the face of the piston force the piston rod back and forth against a little shoulder employed, which in a very short time wears, and for this reason is very unsatisfactory.

At the ball end of the piston rod, I have experienced considerable trouble with breakage below the ball, since at this point the diameter of the piston rod is reduced to allow the ball to rotate in the ball socket far enough to suit the throw of the crank, and in some instances, I have found that the ball becomes disengaged from the socket and the effective operation of the drill is consequently impaired.

To remedy the foregoing objectionable features, I have devised a novel construction of piston rod, which is provided with a T-head at one end and a reduced neck and head at the other end, the entire outer area of the end of said latter head taking up the thrust of the entire rod in both the inside and outside toggles, whereby the piston rod is prevented from wear.

In my present invention, I connect the piston end of the rod to the piston, in lieu of the objectionable ball and socket connection referred to, by means of a T-end connection rotating on a hardened steel pin arc welded into a suitable support, made from a punched and pierced blank, bent to shape, said support being assembled and spot-welded or riveted upon the inner face or bottom of the piston, the swing of the piston rod being limited only by the diameter of the bore of the piston.

In lieu of the objectionable binding nut and threaded split clamping nut heretofore referred to, I employ in place of the soft, straight internally threaded nut referred to, a reinforced, hardened, tapered, internally threaded nut, having preferably about eighteen threads to the inch and in place of the split clamping nut, I extend my novel binding nut long enough to form a bearing for the piston rod, said binding nut being of such form and dimension that considerable force can be exerted in tightening up these parts without damage or undue stretching of the metal, which is very important in this connection.

In the foregoing novel construction of piston rod, together with its manner of attachment to the piston and to the inside and outside toggles, I have devised a construction which will be found to be very rigid and durable for the purpose intended and which will withstand the hard usage to which implements of this character are subjected in shipyards, boiler plants, structural iron works and the like, since the operators of these implements are very frequently unskilled workmen, and it is important in order that the maximum amount of work be accomplished with air tools of this general character, that the same be constructed in a durable and efficient manner, particularly the connections common to the piston, piston rod and inner and outer toggles to which my present invention particularly relates.

For the purpose of illustrating my invention, I have shown in the accompanying drawings certain forms thereof which are at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a vertical sectional view of an air tool or pneumatic drill embodying my invention, showing particularly my novel construction of piston rod, inside and outside toggles, and the manner of securing the T-end of the piston rod to the piston.

Fig. 2 represents on an enlarged scale a plan view, the piston and T-head being shown in section, and the inside and outside toggles in elevation.

Fig. 3 represents a side elevation of Fig. 2, the piston and binding nut being shown in section and the toggles in side elevation.

Fig. 4 represents a plan view, partly in section, of my novel construction of piston rod.

Fig. 5 represents a plan view of a blank from which the connection for securing the piston rod to the piston is formed.

Fig. 6 represents a connecting plate common to the T-end of the piston rod and piston, the same being struck up from the blank seen in Fig. 5.

Fig. 7 represents a section on line 7—7 Fig. 3.

Fig. 8 represents a perspective view of the inside toggles in detached position.

Fig. 9 represents a perspective view of the outside toggles in detached position.

Fig. 10 represents a perspective view of the valve actuating eccentric employed, and Fig. 11 represents a perspective view of the upper portion of the crank shaft coacting with said eccentric.

Similar numerals of reference indicate corresponding parts.

Referring to the drawings:—

In the pneumatic drill or air tool 1 or similar implement to which my invention is applicable, I have illustrated one standard type of drill, in which 2 designates the casing, 3 the piston cylinders having the pistons 4 therein, 5 the crank shaft having its lower portions provided with the bearings 6 and 7, and its upper journal 8 provided with the bearings 9.

10 and 11 designate gearing whereby power is transmitted to the spindle 12 for actuating a drilling, reaming or other tool. 13 designates the valve actuating eccentric having a broached hole 14 therein, which is driven by the parallel flat or driving faces $14^x$ on the upper end 15 of the crank shaft 5, said eccentric being detachable in a vertical direction from said driving faces and actuating the eccentric strap 16, which is connected to the pin 17 of the valve 18.

With the exception of the construction of the eccentric and its manner of actuation and connection with the co-acting driving faces $14^x$, best seen in Figs. 1, 10 and 11, which form the subject-matter of a contemporaneously pending application filed by me, the above referred to elements are of standard construction and require no further descriptions, it being understood that the valve 18, controls through suitable ports and passages the admission and exhaust of the motive fluid to and from the pistons 4, the valve being actuated by the eccentric 13, and the reciprocations of the pistons 4, effecting the rotation of the crank shaft 5, whereby power is transmitted by the gearing 10 and 11 to the spindle 12 through the medium of the connecting rods and toggle connections therefor which constitute the novel features of my present invention and will now be described in detail after a brief reference to the prior art.

The inside and outside toggles in connection with the piston rod and piston of the prior art, are in practice too light and flimsy, the hinges being connected by hinge pins which shear and in addition the reduced section of metal surrounding the hinge pins breaks down, whereby the entire strain is then thrown onto the taper threaded end of the toggles, and the binding nut, which connects the two halves of the toggle. This binding nut of the prior art is made of steel, heat-treated to a certain degree with a practically straight internal thread, to engage the male taper thread on the end of the toggle, and I have found that the practice of forcing this soft, straight threaded, nut over the taper threaded end of the toggles thereby stretching the metal in the nut anywhere from 1/64″ to 1/16″ is very objectionable, since by the time this nut is only half way home, the metal in the nut is fatigued beyond repair, and this mechanism will not in practice withstand the continued wrecking force and vibration to which it is subjected. In the case of the threaded split clamping nut of the prior art, which is intended for a lock, and clamp combined, this part, instead of checking the binding nut, and clamping the piston rod has in practice a tendency to unseat the binding nut already fatigued, and allows the piston rod to become loose and the intermittent impulses of air against the face of the piston force the rod back and forth against a little shoulder which is only 1/32″ and which in a short time wears and for this reason is very unsatisfactory. It has also been the prior art practice to connect the piston rod to the piston by a ball and socket connection and in practice at the ball end of the rod piston I have had considerable trouble with breakage in the neck below the ball since at this point the diameter of the piston rod of the prior art is reduced to allow the ball to rotate in the ball socket far enough to suit the throw of the crank, and in some cases in this type of construction, I have found the ball becomes disengaged from the socket, thus rendering the motor element of the air tool inoperative. To obviate the foregoing objectionable features, I have devised a novel construction of a piston rod and a novel manner of securing the end of said rod to the piston and to a novel construction of inside and outside toggles, which three features constitute my present invention and will now be described.

19 designates my novel construction of piston rod, the same comprising the piston rod proper 20, having at its piston end the enlarged head or T-end 21, having the transverse hole or bearing 22 therethrough, which rotates or oscillates on the hardened hollow steel pin 23. The ends 29 of said pin 23 are arc-welded into the holes 24 of a suitable support, as the ears 25, which are struck up from or integral with the plate or body portion 26, seen in Figs. 5, 6 and 7.

In forming the support for the T end 21 of the piston rod, I take a suitable circular blank, as seen in Fig. 5, and form the cuts 27 and the holes 24 in the ends 25 therein, preferably by a single operation, as will be apparent to those skilled in the art. The ears 25 are then deflected at right angles to the body 26 to form the construction seen in Figs. 1, 6 and 7, and the body portion 26 is either riveted to the inner face or bottom of the piston 4, as indicated at the points 28 in Fig. 7, or it may be spot-welded thereto, if desired.

By arc-welding the ends 29 of the pin 23 into the ears 25, as seen in Figs. 2, 3, and 7, a very rigid and efficient unitary structure is produced when the parts are assembled, it being of course understood that the pin 23 is passed through the bearing 22 in the T-head 21 before its ends 29 are arc welded.

The crank shaft end of the piston rod 20 has the reduced neck 30 terminating in the head 31, and especial attention is called to the fact that the thrust is taken up by the entire end area 32 of the piston rod in both the inside and outside toggles, in conjunction with the shoulder 33, as will be best understood from Fig. 1.

The detailed construction of the toggle members will be best understood from Figs. 2, 3, 8 and 9, which will now be described.

34 designates the inside toggle, see Fig. 8, which is composed of the members 35 and 36, which carry the bearings 37 and 38 respectively, which engage the juxtaposed portions of the crank shaft 5, the member 35 having the tongue 39 engaging and interlocking with the groove 40 of the member 36.

The extension 41 of the member 36 has a seat 42 therein to receive the head 31 of the piston rod 20, it being noted that the end area 32 abuts against the wall 43, while the neck 30 occupies the space 44 and the piston rod proper the bore or space 45, the exterior wall of the latter being threaded, as indicated at 46. The extension 47 of the upper toggle member is similarly internally chambered or constructed, as already described, as will be understood from the right of Fig. 3, and terminates in the threaded member 48, so that the threaded portions 46 and 48 of the parts when assembled as seen at the right of Fig. 3, are engaged by the binding nut 49, which is a reinforced, hardened, tapered, internal, threaded nut, having preferably eighteen threads to the inch and has the extension 50 forming a continuation of the bore 45 extended long enough to form a suitable bearing for the piston rod 20.

The binding nut 49 is of such form and dimension that considerable force can be exerted in tightening up these parts, without damage or undue stretching of the metal, which is a very advantageous feature in this connection.

51 designates the outside toggle seen in Fig. 9, which is composed of the two members 52 and 53. The member 52 has the curved arms 54, which have the internal concave portions 55, which fit over the convex members 37, (see Fig. 8), and said arms terminate in the hooks having the inwardly extending walls 56, which when the parts are assembled engage and interlock with the bottom of the outwardly projecting terminal lips 57 of the lower arms 58 which have the interior concave portions 59, which engage the convex extensions 38. The extension 60 of the member 53 has the recess 61 for the head 31 of its connecting rod, the entire end area 32 of said head exerting a thrust on the wall 62, while the neck 30 occupies the space 63, and the piston rod proper is seated in the space or concavity 64, the outer wall of which is threaded as at 65. The extension 66 of the member 52 is internally similarly constructed, as will be understood from Fig. 3, and is threaded, as at 67, so that the parts when assembled are securely locked by the binding nut 49, as seen at the left of Fig. 2, the tongues 68 interlocking with the grooves 69. I have deemed it unnecessary to describe in detail the precise manner of punching or forming the piston rod support, seen in Fig. 2 from the blank seen in Fig. 5, as it will be evident to those skilled in the art that the blank seen in Fig. 5 can be readily produced by dies of simple construction, and the formation of the support seen in Fig. 6 can be produced by another operation equally simple and the resultant support seen in Fig. 6 will be light, strong and durable for the purpose intended.

When the T head 21 of the piston rod 20 is assembled upon the hardened steel pin, which is preferably hollow for the purpose of lightness, and the ends 29 of said pin have been arc-welded and the plate 26 spot-welded or riveted to the piston 4, as seen in Figs. 2 and 3, a very light, rigid and durable structure is produced, wherein the liability of breakage and undue wear is reduced to a minimum.

By constructing the piston rod 20 with the enlarged T head at its piston end, I provide increased strength at the point where it is most needed, and by collocating the head 31 of the piston rod with the toggles, so that its entire end area 32 abuts directly against the contiguous wall, as 43, of the inside toggles, and 62 of the outside toggles, it will be evident that the entire longitudinal thrust of each piston rod is correctly and effectively applied at the proper point of each of the toggles, and there will be no undue wear at the contiguous portions of the piston rods and toggles, as is the case in the prior art constructions I have heretofore referred to.

By forming the alining bores 45 and 50 in the respective toggles and their coacting binding nuts 49, as will be understood from the right hand of Fig. 3, it will be seen that a sufficient bearing is formed for the piston rod, so as to prevent the latter from exerting any wearing or loosening action upon the contiguous binding nut 49.

By making the bore of the extensions of both the inner and outer toggles to conform to the parts 33, 30, 31 and 32 of the piston rod 20 (see Fig. 4), the toggle members when assembled with respect to their piston rods, interlock properly and effectively therewith.

By constructing the outer members of the outer toggles with the interlocked hooked members best seen in Figs. 3 and 9, the expense of drilling and inserting pins in the hinged ends of the prior art devices above referred to, is entirely dispensed with, and, in addition, the interlocked hooked members strengthen and reinforce the outer terminals of the arms of the outside toggles at a point where they have heretofore been weakened, so that the toggle connections when assembled, as seen in Figs. 1, 2 and 3, constitute a reliable and durable driving connection common to the crank shaft and the piston rods and their adjuncts. By making the binding nut 49 of a thickened or reinforced hardened internally tapered construction, the same will possess the requisite strength, so that considerable strength can be exerted in tightening up the coacting parts, so that they will not be liable to become disconnected during the reciprocations of the piston and the rotation of the crank shaft.

It will be understood that in practice, two pairs of angularly disposed cylinders and pistons, and two pairs of the inside and outside toggles, are employed, whose structure and manner of assembling will be apparent from Figs. 1, 2, 3, 8 and 9. The ports 70 and 71 are provided for lubrication.

While I have shown my invention as especially applicable to a pneumatic drill, it will be understood that I do not limit myself thereto, as the broad principles of my invention are applicable to other types of motors and to any construction wherein a rigid and durable connection is required between the piston or motor, its piston rod and the coacting toggle elements which engage the crank shaft of a motor or the like where the pistons are of small size, and where it is essential that a rigid and durable connection be had intermediate the pistons and the crank shaft to effect the rotation of the latter.

It will now be apparent that I have devised a novel and useful connecting rod and toggle for pneumatic drills, air tools and the like, which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a pneumatic drill or other tool, the combination of piston cylinders, pistons therein, a crank shaft, inside and outside toggles therefor, piston rods having one end connected to said pistons and their other ends connected to said toggles, the terminals of one pair of arms of said outside toggles having hooked ends formed by the inwardly projecting walls 56, which engage the bottom of the outwardly projecting terminal lips 57 of the opposite pair of arms of said toggles, said walls and lips being thereby interlocked, and a binding nut for the threaded portions of each of said toggles.

2. In a pneumatic drill or other tool, the combination of piston cylinders, pistons therein, a crank shaft, inside and outside toggles therefor, piston rods having one end connected to said pistons and their other ends connected to said toggles, the outer terminals of the arms of said outside toggles having hooked ends interlocked together, one pair of said terminals having inwardly projecting walls 56 and the other pair of said terminals having the outwardly projecting lips 57, the entire end area of the toggle ends of said piston rods abutting against a wall in said respective toggles, whereby the thrust of said piston rods is imparted directly to said walls, and a binding nut for each threaded portion of said toggles.

3. In a pneumatic drill or other tool, the combination of piston cylinders, pistons therein, a crank shaft, inside and outside toggles therefor, piston rods having one end connected to said pistons and their other ends connected to said toggles, the outer terminals of the arms of said outside toggles having hooked ends interlocked together, one pair of said terminals having the inwardly projecting walls 56 and the other pair of said terminals having the outwardly projecting lips 57, the toggle ends of said piston rods having a neck and a head locked in seats therefor in extensions of the respective toggle members, and a binding nut engaging the threaded extensions of said toggle members, said nuts and the outer ends of said toggle extensions having alining bores to afford an elongated bearing for said piston rods in both said binding nuts and toggle extensions.

4. In a pneumatic drill or other tool, the combination of piston cylinders, pistons therein, a crank shaft, inside and outside toggles therefor, piston rods having one end connected to said pistons and their other ends connected to said toggles, the outer terminals of the arms of said outside toggles having hooked ends interlocked together, one pair of said terminals having the inwardly projecting walls 56 which engage the bottom of the outwardly projecting terminal lips 57 of the opposite arms of said outside toggles, the toggle ends of said piston rods having a neck and a head locked in seats therefor in extensions of the respective toggle members, and a single taper binding nut engaging the threaded extensions of each of said toggle members, said nuts and the outer ends of said extensions having alining bores to afford an elongated bearing for said piston rods in both said nuts and toggle extensions, the entire end area of the toggle ends of said piston rods abutting against a wall in their respective toggles, whereby the thrust of said piston rods is imparted directly to said walls.

5. In a pneumatic drill or other tool, the combination of piston cylinders, pistons therein, piston rods connected to said pistons, a crank shaft, inside and outside toggles common to said crank shaft and the juxtaposed portions of said piston rods, the entire end area of the toggle ends of said piston rods abutting against a wall in their respective toggles, whereby the thrust of said piston rods is imparted directly to said walls, hooked terminals interlocked together on the outer ends of said outside toggles, and a binding nut for each of said toggles, said hooked terminals being retained in interlocked position by their respective binding nuts.

6. The combination of piston cylinders, pistons therein, piston rods connected to said pistons, a crank shaft and inside and outside toggles common to said crank shaft and the juxtaposed ends of said piston rods, said outside toggles having the outer terminals of their arms provided with interlocked hooks, said hooks being formed by the inwardly projecting walls 56 and the outwardly projecting lips 57 of a juxtaposed pair of toggles, and binding nuts for retaining said toggles in engagement with said piston rods.

7. The combination of piston cylinders, pistons therein, piston rods connected to said pistons, a crank shaft and inside and outside toggles common to said crank shaft and the juxtaposed ends of said piston rods, said outside toggles having the outer terminals of their arms provided with interlocked hooks, said hooks being formed by the inwardly projecting walls 56 and the outwardly projecting lips 57 of a juxtaposed pair of toggles, and binding nuts for retaining said toggles in engagement with said piston rods, the entire end area of the toggle ends of said piston rods abutting against a wall in their respective toggles whereby the thrust of said piston rods is imparted directly to said walls.

8. In a device of the character stated, piston cylinders, pistons therein, piston rods for said pistons, a crank shaft, an inside toggle composed of the members 35 and 36, having the tongue and groove 39 and 40 respectively, the bearings 37 and 38 and the tapered threaded extension having the internal seats 42, 44 and 45, and an outside toggle composed of the members 52 and 53, provided with the curved outer arms engaging said bearings 37 and 38, the outer terminals of one pair of said arms having the inwardly projecting walls 56 and the outer terminals of the opposite pair of said outer arms having the outwardly projecting lips 57 adapted to interlock with said walls 56 and the opposite portions of said toggles having tapered threaded extensions provided with the internal seats 61, 63 and 64.

9. In a device of the character stated, piston cylinders, pistons therein, piston rods for said pistons, a crank shaft, an inside toggle composed of the members 35 and 36, having the tongue and groove 39 and 40 respectively, the bearings 37 and 38 and the tapered threaded extensions having the internal seats 42, 44 and 45, and an outside toggle composed of the members 52 and 53, provided with the curved outer arms engaging said bearings 37 and 38, the outer terminals of one pair of said arms having the inwardly projecting walls 56 and the outer terminals of the opposite pair of said arms having the outwardly projecting lips 57 adapted to interlock with said walls 56, and the opposite portions of said toggles having tapered threaded extensions provided with the internal seats 61, 63 and 64, said piston rods engaging said seats, and a single tapered binding nut engaging each of said tapered threaded extensions.

10. In a device of the character stated, piston cylinders, pistons therein, piston rods for said pistons, a crank shaft, an inside toggle composed of the members 35 and 36, having the tongue and groove 39 and 40 respectively, the bearings 37 and 38 and the tapered threaded extensions having the internal seats 42, 44 and 45, and an outside toggle composed of the members 52 and 53, provided with the curved outer arms engaging said bearings 37 and 38, the outer terminals of one pair of said arms having the inwardly projecting walls 56 and the outer terminals of the opposite pair of said arms having the outwardly projecting lips 57 adapted to interlock with said walls 56 and the opposite portions of said toggles having tapered threaded extensions provided with the internal seats 61, 63 and 64, said piston rods having necks 30 and heads 31 engaging said seats, and tapered binding nuts engaging said threaded extensions.

11. The herein described outside toggle, comprising two members having curved arms and exteriorly threaded extensions, the interior of said extensions being recessed for the reception of the end of a piston rod, the outer terminals of said arms having hooks thereon adapted to be inter-locked together.

12. The herein described outside toggle, comprising two members having curved arms, and tapered exteriorly threaded extensions, the interior of said extensions being recessed for the reception of the end of a piston rod, the outer terminals of said arms having hooks thereon adapted to be interlocked together, and an interiorly tapered binding nut engaging said tapered threaded extensions.

13. The herein described outside toggle, comprising two members having curved arms and threaded extensions, the outer terminals of said arms having hooks thereon adapted to be interlocked together and said extensions having the end wall 62 and the seats 61, 63 and 64 for the reception of the end of a piston rod.

14. The combination of a piston rod, an inside toggle comprising two arms having exteriorly threaded extensions, within which the end of said piston rod is seated, a binding nut for said extensions, an outside toggle having curved arms and exteriorly threaded extensions, a second piston rod, the interior of said latter extensions being also recessed for the reception of the end of said latter piston rod, hooks on the outer terminals of said arms adapted to be interlocked together, and a binding nut for said threaded extensions of said outside toggle.

LEWIS SYKES.

Witnesses:
J. W. MEEKER,
WM. A. KREUSSER.

Copies of this patent may be obtained for five cents each, by addressing the "Commissioner of Patents, Washington, D. C."